United States Patent
Dudar

(10) Patent No.: US 12,502,698 B2
(45) Date of Patent: Dec. 23, 2025

(54) SYSTEMS AND METHODS FOR CAPLESS REFUELING SYSTEM CLEANING

(71) Applicant: Ford Global Technologies, LLC, Dearborn, MI (US)

(72) Inventor: Aed Dudar, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 750 days.

(21) Appl. No.: 17/936,252

(22) Filed: Sep. 28, 2022

(65) Prior Publication Data

US 2023/0113767 A1  Apr. 13, 2023

Related U.S. Application Data

(62) Division of application No. 17/450,427, filed on Oct. 8, 2021, now Pat. No. 11,498,101.

(51) Int. Cl.
*B08B 9/032* (2006.01)
*B08B 5/00* (2006.01)
*B67D 7/06* (2010.01)

(52) U.S. Cl.
CPC .............. *B08B 9/0328* (2013.01); *B08B 5/00* (2013.01); *B08B 9/0325* (2013.01); *B67D 7/06* (2013.01); *B08B 2209/032* (2013.01)

(58) Field of Classification Search
CPC .... B60K 2015/0429; B60K 2015/0419; B60K 2015/0445; B60K 15/04; B60K 15/05
See application file for complete search history.

(56) References Cited

U.S. PATENT DOCUMENTS

| | | | | |
|---|---|---|---|---|
| 4,598,741 A | * | 7/1986 | Johnson | B67D 7/0476 141/5 |
| 4,715,509 A | * | 12/1987 | Ito | B60K 15/04 141/59 |
| 4,966,299 A | * | 10/1990 | Teets | B60K 15/04 141/303 |
| 6,775,057 B2 | * | 8/2004 | Akasaka | H01S 3/094096 359/337.5 |

(Continued)

FOREIGN PATENT DOCUMENTS

| | | | | |
|---|---|---|---|---|
| CN | 101936204 A | * | 1/2011 | ........... B60K 15/035 |
| JP | 2005524577 A | * | 8/2005 | ............. B60K 15/04 |

(Continued)

OTHER PUBLICATIONS

"Ford Code P0455 P0457—Ford Escape Check Fuel Fill Inlet Message," YouTube Website, Available Online at https://youtu.be/Ss00nvQKZkQ, Oct. 10, 2015, 4 pages.

(Continued)

*Primary Examiner* — Joel D Crandall
(74) *Attorney, Agent, or Firm* — Vincent Mastrogiacomo; McCoy Russell LLP

(57) ABSTRACT

Methods and systems are provided for capless refueling system of a vehicle. In one example, a method may include cleaning a capless unit of a capless refueling system by generating vacuum in the capless refueling system and delivering compressed air to the capless unit from an electrical booster of an engine. The compressed air may be delivered to the capless unit via a two-way valve configured to control a flow path of the compressed air.

8 Claims, 6 Drawing Sheets

(56) References Cited

U.S. PATENT DOCUMENTS

| | | | |
|---|---|---|---|
| 6,983,773 B1* | 1/2006 | Hagano | B60K 15/04 |
| | | | 141/348 |
| 9,216,891 B2* | 12/2015 | Chretien | B60K 15/04 |
| 9,376,989 B2 | 6/2016 | Peters et al. | |
| 9,724,736 B2 | 8/2017 | Dudar et al. | |
| 10,024,750 B2* | 7/2018 | Yang | G01M 3/025 |
| 10,345,187 B2 | 7/2019 | Yang et al. | |
| 10,364,762 B2 | 7/2019 | Dudar et al. | |
| 10,480,439 B2 | 11/2019 | Dudar | |
| 10,513,958 B2 | 12/2019 | Dudar | |
| 10,598,060 B2 | 3/2020 | Dudar | |
| 10,690,066 B2 | 6/2020 | Dudar et al. | |
| 10,746,093 B2 | 8/2020 | Dudar | |
| 10,760,517 B2 | 9/2020 | Dudar | |
| 10,859,044 B2 | 12/2020 | Dudar | |
| 10,914,251 B2 | 2/2021 | Dudar | |
| 2013/0213963 A1* | 8/2013 | Chretien | B60K 15/04 |
| | | | 220/86.2 |
| 2014/0216563 A1* | 8/2014 | Dudar | F02M 25/0809 |
| | | | 137/15.04 |
| 2015/0298541 A1* | 10/2015 | Bar | B60K 15/05 |
| | | | 220/86.2 |
| 2017/0198662 A1* | 7/2017 | Dudar | F02M 25/0818 |
| 2017/0356360 A1* | 12/2017 | Dudar | F02M 25/0809 |
| 2018/0252610 A1* | 9/2018 | Yang | G01M 3/32 |
| 2019/0070907 A1* | 3/2019 | Dudar | F02B 39/10 |
| 2019/0145362 A1* | 5/2019 | Dudar | F02M 35/10393 |
| | | | 123/184.21 |
| 2019/0195153 A1* | 6/2019 | Dudar | F02D 41/1448 |
| 2019/0211768 A1* | 7/2019 | Dudar | F02D 41/221 |
| 2019/0257231 A1* | 8/2019 | Dudar | F01N 13/10 |

FOREIGN PATENT DOCUMENTS

| | | | | |
|---|---|---|---|---|
| KR | 20010046882 A | * | 6/2001 | B60K 15/04 |
| TW | I246474 B | | 1/2006 | |

OTHER PUBLICATIONS

"Capless Fuel Fill System Replacement," Ford Edge Forum Website, Available Online at https://www.fordedgeforum.com/topic/20853-capless-fuel-fill-system-replacement/, Jul. 17, 2016, 8 pages.

Davies, A., "A Little Fan That Fixes the Turbocharger's Biggest Problem," Wired Website, Available Online at https://www.wired.com/2017/04/little-fan-fixes-turbochargers-biggest-problem/, Apr. 28, 2017, 5 pages.

"How to fix ford fuel fill inlet problem," YouTube Website, Available Online at https://www.youtube.com/watch?v=M47wHH4bugo, Jun. 15, 2017, 4 pages.

* cited by examiner

SYSTEMS AND METHODS FOR CAPLESS REFUELING SYSTEM CLEANING

CROSS REFERENCE TO RELATED APPLICATION

The present application is a divisional of U.S. Non-Provisional patent application Ser. No. 17/450,427, entitled "SYSTEMS AND METHODS FOR CAPLESS REFUELING SYSTEM CLEANING", and filed on Oct. 8, 2021. The entire contents of the above-listed application are hereby incorporated by reference for all purposes.

FIELD

The present description relates generally to methods and systems for reducing evaporative emissions from a capless refueling system.

BACKGROUND/SUMMARY

A vehicle may utilize a capless refueling system to increase an efficiency and convenience of refueling. The capless refueling system may include a capless unit with a port for receiving a refueling nozzle, the port configured with two pivotable flaps, hereafter flappers, that allow fuel to be added to a fuel tank of the vehicle. By precluding removal and replacing of a gas cap during refueling events, evaporative emissions may be reduced while a refueling process may be simplified.

Over time, debris, such as dust, salt, leaves, etc., may accumulate in the capless unit which may interfere with an ability of the flappers to seal the port. Fuel vapors from the fuel tank may thereby escape to the atmosphere through the degraded sealing of the flappers. Furthermore, detection of a leak at the capless unit may cause a diagnostic trouble code (DTC) to be set which may be displayed to the operator at the vehicle dash. While instructions for resolving the DTC may be included in an operating manual of the vehicle, if the operator does not locate the instructions, the DTC may progress to illuminate a malfunction indicator lamp (MIL). Observation of the MIL may prompt the operator to have the vehicle serviced, only to determine the issue does not warrant a cost of servicing.

Attempts to address leakage from a capless refueling system include leveraging engine vacuum to clean the capless refueling system. One example approach is shown by Dudar et al. in U.S. Pat. No. 9,724,736. Therein, if a leak is detected after a refueling event but not during the refueling event, the capless refueling system may be cleaned using engine vacuum. Engine vacuum may be communicated to the capless refueling system by closing a fuel vapor canister vent valve and opening a fuel vapor canister purge valve for a duration. By exposing the capless refueling system to engine vacuum, contaminants (e.g., debris) in a capless unit of the capless refueling system may be forced into a fuel tank, allowing the capless unit to seal.

However, the inventors herein have recognized potential issues with such systems. As one example, the cleaning may only be conducted if purging of the fuel vapor canister is not demanded. Such opportunistic cleaning of the capless unit may be insufficient to address contamination of the capless unit during periods where the capless unit is subject to frequent accumulation of debris, such as during off-road driving, navigating dirt roads, seasonal changes resulting in variable weather patterns and road conditions, etc.

In one example, the issues described above may be addressed by a method for cleaning a capless unit of a capless refueling system by generating vacuum in the capless refueling system and delivering compressed air to the capless unit from an electrical booster of an engine. In this way, the capless unit may be efficiently cleaned onboard using an already existing, readily available device and at a frequency corresponding to a rate of debris accumulation.

As one example, the electrical booster may be fluidically coupled to the capless unit by a two-way valve adjustable between a first position and a second position. When the engine is operating, the two-way valve may be maintained in the first position to allow recirculation of compressed air within an air induction system of the engine. When the engine is not operating and cleaning of the capless unit is requested, the two-way valve may be adjusted to the second position to deliver the compressed air to the capless unit. Furthermore, prior to adjustment of the two-way valve to the second position, vacuum in the capless refueling system may be generated by an evaporative leak control module (ELCM) of the vehicle, causing pivotable flaps of the capless unit to intermittently open and loosen and/or displace debris trapped in the capless unit. The debris may be completely removed when the capless unit is flushed with the compressed air. As a result, the method leverages a presence of an underutilized device (e.g., the electrical booster) to enable efficient removal of debris from the capless unit without incurring additional costs or vehicle downtime. In addition, a frequency of cleaning of the capless unit may be adjusted according to driving conditions, thereby reducing escape of evaporative emissions from the capless refueling system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is shown approximately to scale.

DETAILED DESCRIPTION

Figure 1:
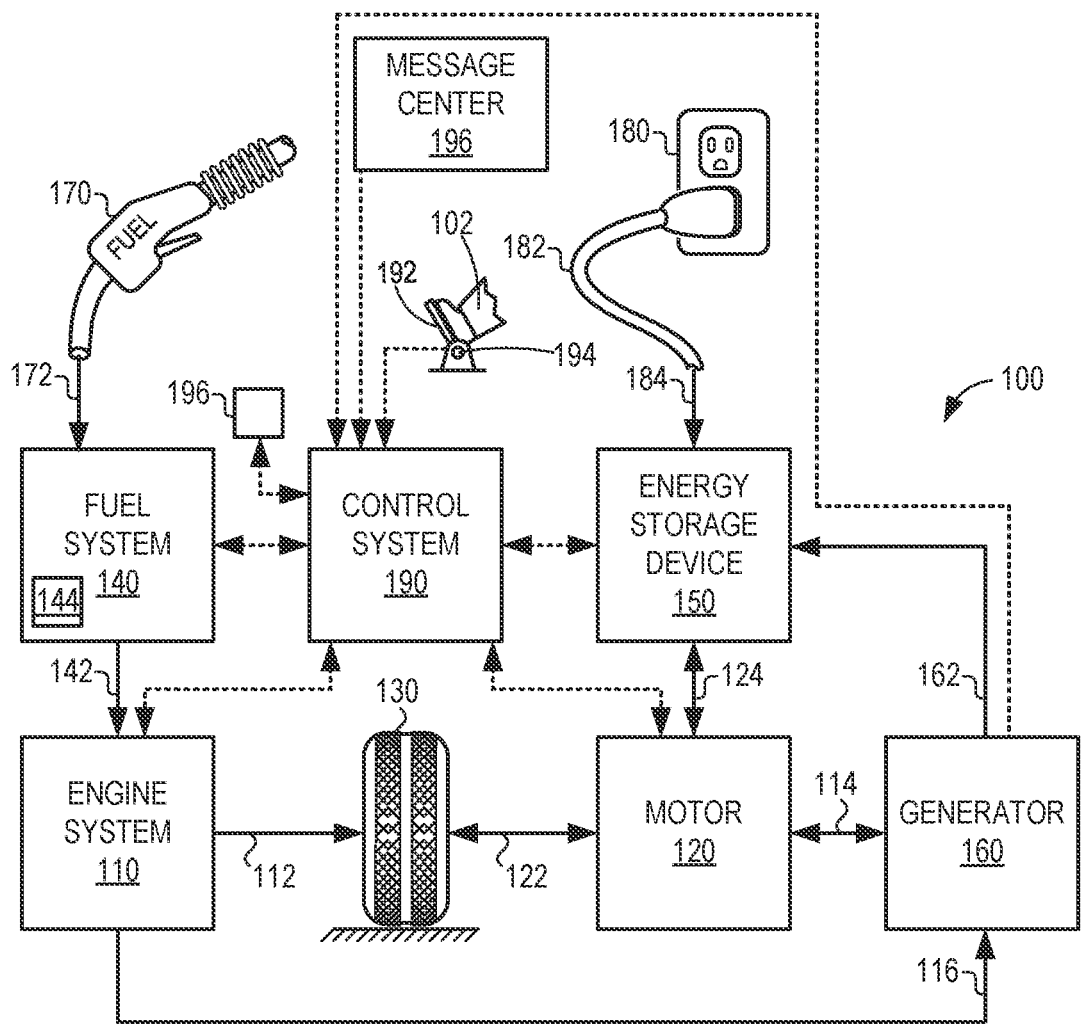
FIG. 1 shown an example of a vehicle system in which a capless refueling system may be implemented.
Figure 2:
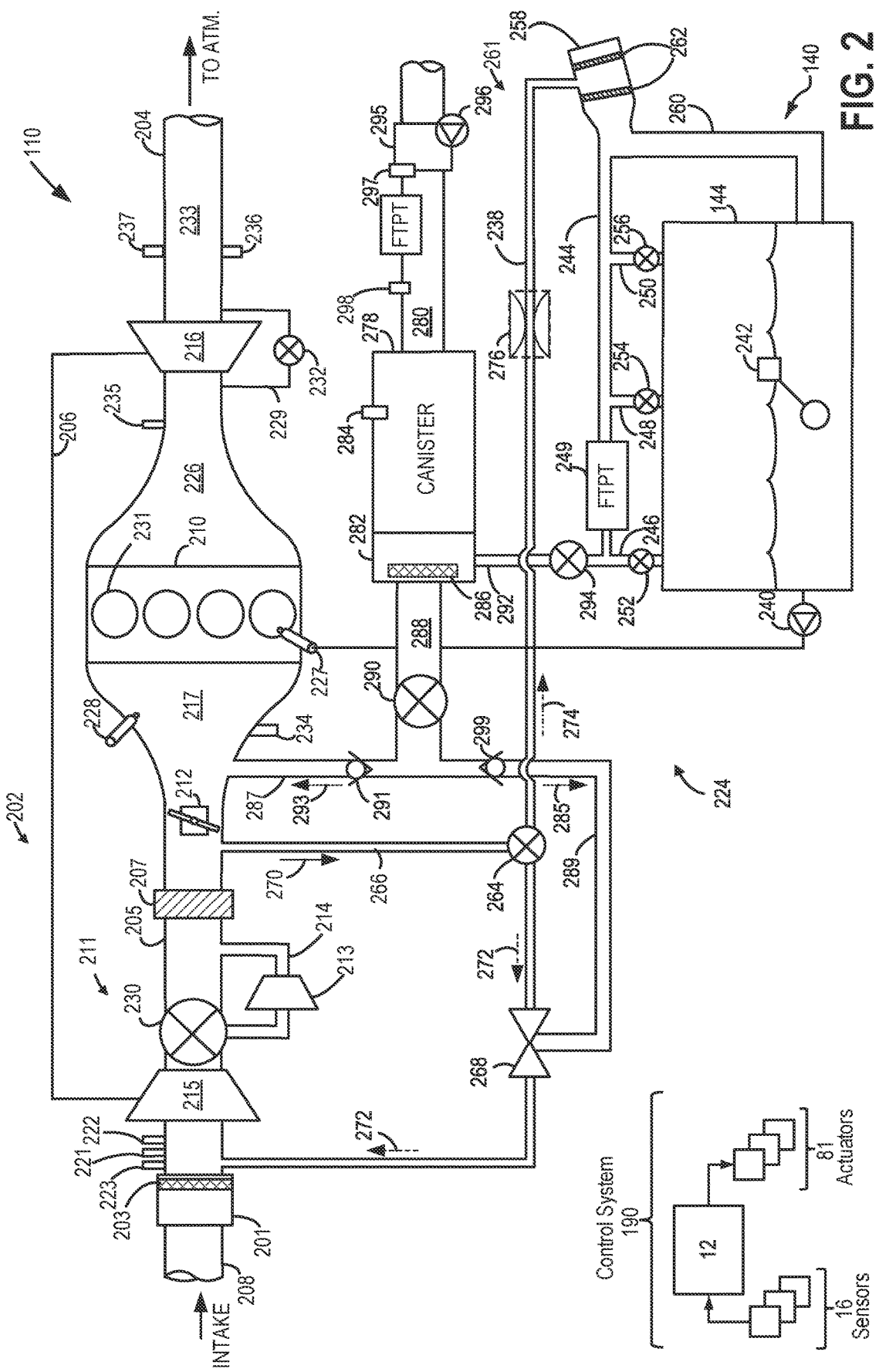
FIG. 2 shows an example of an evaporative emissions control (Evap) system of an engine system which includes the capless refueling system and an electrical booster (ebooster).
Figure 3:
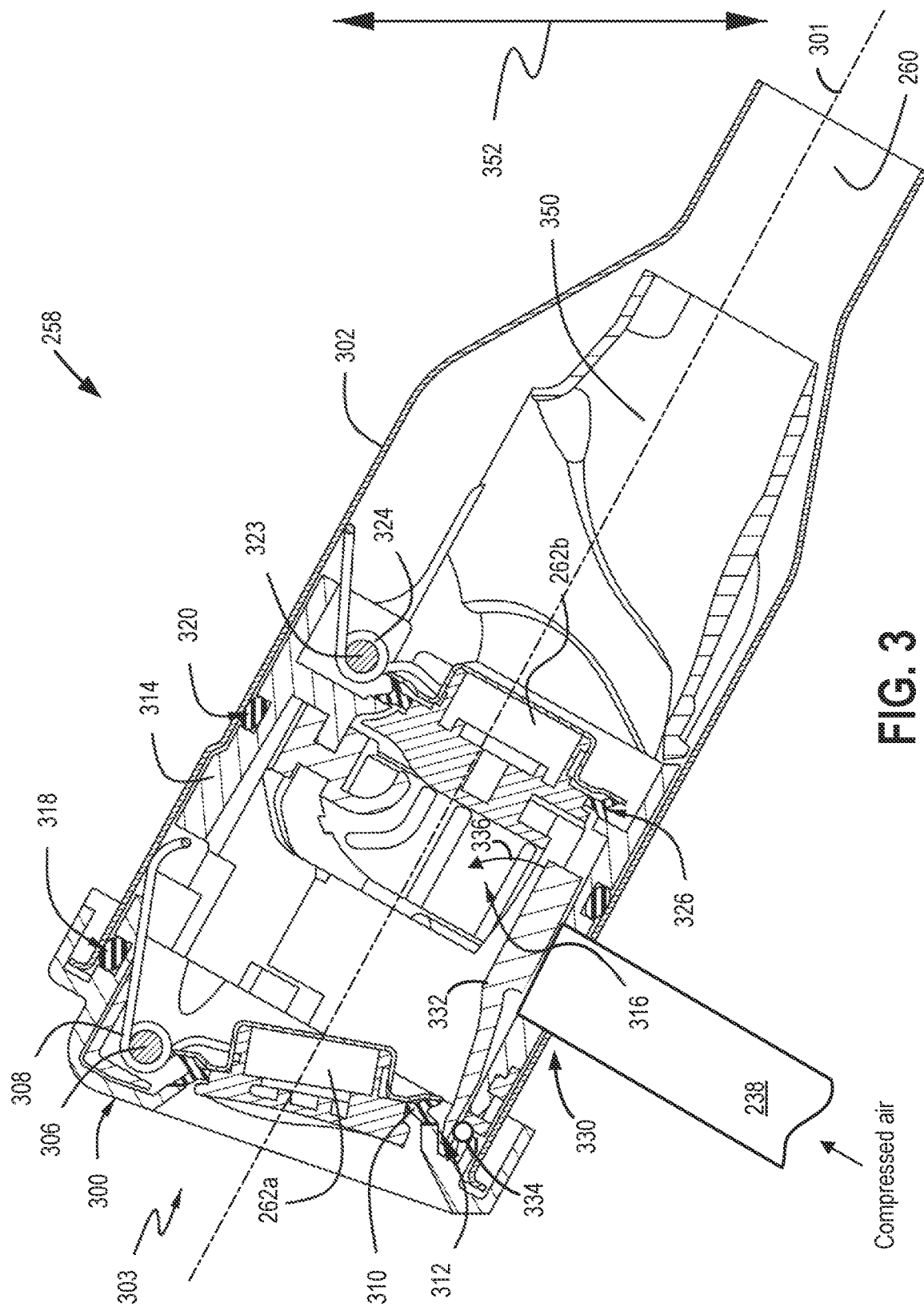
FIG. 3 shows an example of a capless unit of the capless refueling system.
Figure 4:
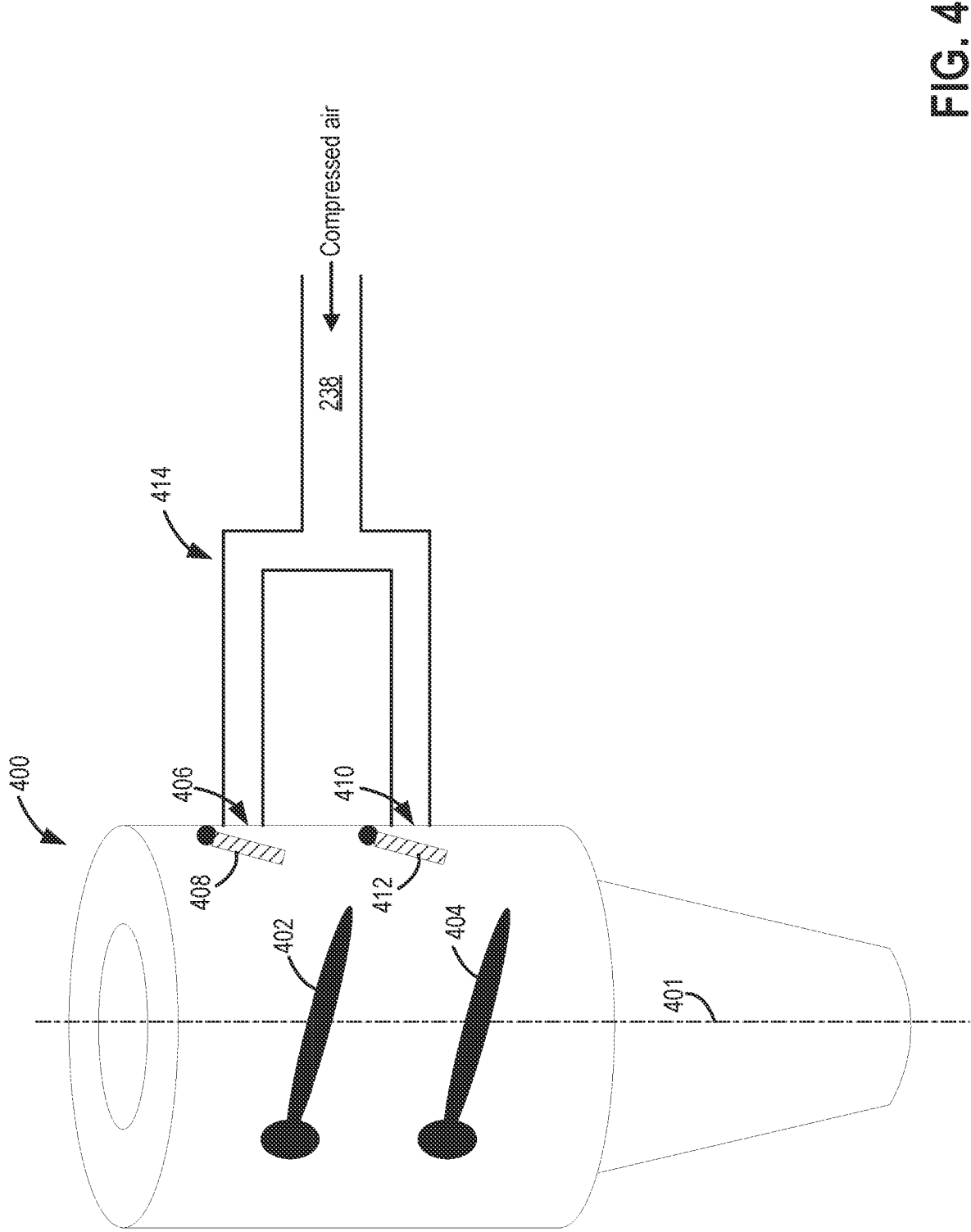
FIG. 4 shows an alternate embodiment of the capless unit in which a pneumatic manifold is coupled to the capless unit.

The following description relates to systems and methods for a capless refueling system. The capless refueling system may be used in a vehicle system which relies on fuel combustion at an engine for propulsion. An example of such a vehicle system is depicted in FIG. 1. The engine may include an evaporative emissions control (Evap) system, as shown in FIG. 2. Furthermore, the engine may be configured with an electrical booster (hereafter, ebooster) to supplement a turbocharger and mitigate turbo lag. The ebooster, when not operating to spool up the turbocharger, may be leveraged to clean a capless unit of the capless refueling system. An example of the capless unit is illustrated in FIG. 3 and in one example, as shown in FIG. 4, a manifold may be coupled to the capless unit to deliver boosted air for removing debris and other contaminants from the capless unit. An example of a method for cleaning the capless refueling system using the ebooster during engine-off conditions is shown in a flowchart in FIG. 5. Variations and adjustments to vehicle parameters during cleaning of the capless refueling system are depicted in a prophetic graph in FIG. 6.

FIGS. 3-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 1, it illustrates an example vehicle system 100. Vehicle system 100 includes a fuel burning engine system 110 and a motor 120. As a non-limiting example, engine system 110 is an internal combustion engine and motor 120 is an electric motor. Motor 120 may be configured to utilize or consume a different energy source than engine system 110. For example, engine system 110 may consume a liquid fuel (e.g., gasoline) to produce an engine output while motor 120 may consume electrical energy to produce a motor output. As such, a vehicle system 100 may be referred to as a hybrid electric vehicle (HEV).

Vehicle system 100 may utilize a variety of different operational modes depending on operating conditions encountered by the vehicle propulsion system. Some of these modes may enable engine system 110 to be maintained in an off state (e.g., set to a deactivated state) where combustion of fuel at the engine is discontinued. For example, under select operating conditions, motor 120 may propel the vehicle via drive wheel 130 as indicated by arrow 122 while engine system 110 is deactivated.

During other operating conditions, engine system 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine system 110 may be operated by combusting fuel received from fuel system 340 as indicated by arrow 142. For example, engine system 110 may be operated to propel the vehicle via drive wheel 130 as indicated by arrow 112 while motor 120 is deactivated. During other operating conditions, both engine system 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine system 110 may propel the vehicle via a second set of drive wheels.

In other embodiments, vehicle system 100 may be configured as a series type vehicle propulsion system, whereby the engine does not directly propel the drive wheels. Rather, engine system 110 may be operated to power motor 120, which may in turn propel the vehicle via drive wheel 130 as indicated by arrow 122. For example, during select operating conditions, engine system 110 may drive generator 160, as indicated by arrow 116, which may in turn supply electrical energy to one or more of motor 120 as indicated by arrow 114 or energy storage device 150 as indicated by arrow 162. As another example, engine system 110 may be operated to drive motor 120 which may in turn provide a generator function to convert the engine output to electrical energy, where the electrical energy may be stored at energy storage device 150 for later use by the motor.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g., E10, E85, etc.) or a blend of gasoline and methanol (e.g., M10, M85, etc.), whereby these fuels or fuel blends may be delivered to engine system 110 as indicated by arrow 142. Still other suitable fuels or fuel blends may be supplied to engine system 110, where they may be combusted at the engine to produce an engine output. The engine output may be utilized to propel the vehicle as indicated by arrow 112 or to recharge energy storage device 150 via motor 120 or generator 160.

Fuel system 140 may periodically receive fuel from a fuel source residing external to the vehicle. As a non-limiting example, vehicle system 100 may be refueled by receiving fuel via a fuel dispensing device 170 as indicated by arrow 172. In some embodiments, fuel tank 144 may be configured to store the fuel received from fuel dispensing device 170 until it is supplied to engine system 110 for combustion. In some embodiments, a control system 190 may receive an indication of the level of fuel stored at fuel tank 144 via a fuel level sensor. The level of fuel stored at fuel tank 144 (e.g., as identified by the fuel level sensor) may be communicated to the vehicle operator, for example, via a fuel gauge or indication in a vehicle instrument panel 196.

In one example, as described further below, fuel system 140 may include a capless refueling system, as shown in FIG. 2. The capless refueling system may include a capless unit, as illustrated in detail in FIG. 3, configured to receive and interface with the fuel dispensing device 170. The capless unit may include at least two pivotable flaps, or flappers, arranged in a receiving port of the capless unit, the flappers configured to seal the receiving port and fuel tank 144 from the surrounding atmosphere. The fuel dispensing device 170 may be inserted into the receiving port of the capless unit to deliver fuel to fuel tank 144. For example, as the fuel dispensing device 170 is pushed into the receiving port, a force may be exerted on the flappers by the fuel dispensing device 170, causing the flappers to pivot towards inner walls of the receiving port to accommodate a positioning of the fuel dispensing device 170 within the receiving port. In some instances, debris may enter or accumulate at the capless unit, inhibiting an ability of the flappers to seal. The capless unit may be cleaned using an electrical booster, e.g., an ebooster, of the engine system 110, as described further below.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. Furthermore, the energy storage device 150 may power the e-booster, particularly during cleaning events of the capless unit of the capless refueling system. As a non-limiting example, energy storage device 150 may include one or more batteries and/or capacitors.

Control system 190 may communicate with one or more of engine system 110, motor 120, fuel system 140, energy storage device 150, and generator 160. For example, control system 190 may receive sensory feedback information from one or more of engine system 110, motor 120, fuel system 340, energy storage device 150, and generator 160. Further, control system 190 may send control signals to one or more of engine system 110, motor 120, fuel system 340, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g., not part of the vehicle) as indicated by arrow 184. As a non-limiting example, vehicle system 100 may be configured as a plug-in hybrid electric vehicle (PHEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may be disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that is not included in the vehicle. In this way, motor 120 may propel the vehicle by utilizing an energy source other than the fuel utilized by engine system 110.

In one example, the vehicle control system 190 may be coupled to a network such as a cloud-based network. In addition, the vehicle may be coupled to a remote server and a controller of one or more other vehicles. Additionally, the vehicle control system 190 may be coupled to a mobile device of the operator via cloud-based communication and so messages pertaining to engine operation or vehicle system status may be communicated to the driver though the operator's mobile device.

FIG. 2 schematically shows aspects of the example engine system 110 of the vehicle system 100 of FIG. 1. In one example, as described above, the on-road vehicle is a hybrid electric vehicle. In the depicted embodiment, engine system 110 includes an internal combustion engine 210, which is coupled to an air induction system 211 including one or more boosting devices. In the depicted example, the boosting devices include a turbocharger 202 and an ebooster 213. Turbocharger 202 includes a turbine 216 positioned in the exhaust passage 204 coupled to a compressor 215 via a shaft 206. Compressor 215 is positioned in an intake passage 208 upstream of a charge air cooler 207 (also referred to herein as CAC) and a throttle 212. In the example of FIG. 2, ebooster 213 is positioned downstream from compressor 215, however in other example engine systems, ebooster 213 may be positioned upstream of compressor 215. Ebooster 213 may be energized by an energy storage device, such as the energy storage device 150 of FIG. 1, and may be used to intermittently provided boosted air to the engine to expedite spooling of turbocharger 202 during transient events.

The engine 210 receives air along the intake passage 208 via an air box 201 including air cleaner 203. Incoming air is compressed by the one or more boosting devices (e.g., compressor 215 and ebooster 213) and the boosted (e.g., compressed) air is delivered to an induction passage 205. The compressed air passes through the induction passage 205, through the CAC 207 to be cooled, and through the throttle 212 before flowing into an intake manifold 217 where the compressed air enters the engine 210. In other words, compressor 215 and ebooster 213 are fluidically coupled through CAC 207 to the throttle 212, and the throttle 212 is fluidically coupled to intake manifold 217 and positioned upstream of intake manifold 217. The CAC 207 may be an air-to-air or water-to-air heat exchanger, for example. In the embodiment shown in FIG. 2, the pressure of the air charge within the intake manifold 217 is monitored by a manifold air pressure (MAP) sensor 234.

As described above, compressor 215 is mechanically coupled to turbine 216 via shaft 206, where turbine 216 driven by expanding engine exhaust. However, other combinations and configurations of boosting devices may be possible. In one embodiment, the turbocharger 202 may be a twin scroll device. In another embodiment, the turbocharger 202 may be a variable geometry turbocharger (VGT), where turbine geometry is actively varied as a function of engine operating conditions. In yet another embodiment, engine system 110 may include a supercharger or both a supercharger and turbocharger. For an embodiment that includes a supercharger, compressor 215 may be at least partially driven by an electric machine and/or the engine 210, and may not include turbine 216.

One or more sensors may be coupled to an inlet of compressor 215 as shown in FIG. 2. For example, a temperature sensor 221 may be coupled to the inlet for estimating a compressor inlet temperature. As another example, a pressure sensor 222 may be coupled to the inlet of compressor 215 for estimating a pressure of air charge entering the compressor. Still other sensors may include, for example, air-fuel ratio sensors, humidity sensors, etc. In other examples, one or more of the compressor inlet conditions (such as humidity, temperature, etc.) may be inferred based on engine operating conditions. The sensors may estimate a condition of the intake air received at the compressor inlet from the intake passage 208 as well as the air charge recirculated from downstream of the CAC 207. One or more sensors may also be coupled to the intake passage 208, upstream of compressor 215, for determining a composition and condition of air charge entering the compressor. These sensors may include, for example, a manifold air flow sensor 223.

In the example of FIG. 2, ebooster 213 is positioned in series with compressor 215 and downstream of compressor 215. In contrast to electrically assisted turbochargers, ebooster 213 provides a second distinct boosting stage. As such, the pressures of the two charging units are multiplied. Ebooster 213 may be positioned in a bypass passage 214, and may be operated by a controller 12 of the control system 190 in conjunction with a bypass valve 230. In one example, the controller 12 may be a powertrain control module (PCM). For example, the controller 12 may close bypass valve 230 to divert air flow from the intake passage 208 through the bypass passage 214 and ebooster 213 while supplying electrical power to ebooster 213. In contrast, the controller 12 may open bypass valve 230 to direct intake air flow to at least partially bypass ebooster 213. The air induction system 211 may further include a recirculation passage 266 to divert a portion of the compressed air flowing through the induction passage 205 from downstream of compressor 215 and ebooster 213 to upstream of compressor 215. Further details of the recirculation passage 266 are provided below.

During vehicle operation when the engine is on, the control system 190 may supply electrical power from the energy storage device to ebooster 213 for supplementing the intake air boost provided by compressor 215 of the turbocharger 202. As an example, electrical power may be supplied to ebooster 213 during turbo lag conditions when the turbocharger response for boosting the intake air is slower than a torque demand. Turbo lag may arise due to time elapsed for fuel and air to be combusted in combustion chambers 231 of the engine 210 and to flow through an exhaust passage 233 prior to driving turbine 216 and compressor 215. Furthermore, additional time lag may arise due to turbine 216 and/or compressor 215 spool-up to high enough speeds such that the compressor 215 may provide mechanically-driven boosting of the intake air at a high enough desired boost pressure. Accordingly, while the engine is on, electrical power may be supplied to ebooster 213 during higher instantaneous torque demands (e.g. sudden acceleration, and the like) to deliver boosted air until the turbo lag elapses and compressor 215 can provide boosted air to the engine 210. Once the turbo lag elapses, electrical power supplied to ebooster 213 may be stopped while the engine is on, thereby preserving charge in the energy storage device 150.

As further described herein, ebooster 213 may be utilized to clean a capless refueling system 261 of the vehicle. The capless refueling system 261 may be included in fuel system 140 and may be coupled to an evaporative emissions control (Evap) system 224 of the engine system 110, as described further below. For example, electrical power may be supplied to power ebooster 213 from the energy storage device during a first condition, where the first condition includes detection of a leak at the capless refueling system 261. The first condition may further include a deactivated, e.g., off, status of the engine 210. By activating ebooster 213 while the engine 210 is off and operating/moderating components of both the Evap system 224 and the capless refueling system 261, a capless unit 258 of the capless refueling system 261 may be cleared of debris that may inhibit a sealing capability of the capless unit 258.

Intake manifold 217 is coupled to the combustion chambers 231 through a series of intake valves (not shown). The combustion chambers 231 are further coupled to an exhaust manifold 226 via a series of exhaust valves (not shown). In the depicted embodiment, a single exhaust manifold 226 is shown. However, in other embodiments, the exhaust manifold 226 may include a plurality of exhaust manifold sections. Configurations having a plurality of exhaust manifold sections may enable effluent from different combustion chambers to be directed to different locations in the engine system 110.

In one embodiment, each of the exhaust and intake valves may be electronically actuated or controlled. In another embodiment, each of the exhaust and intake valves may be cam actuated or controlled. Whether electronically actuated or cam actuated, the timing of exhaust and intake valve opening and closure may be adjusted as specified for desired combustion and emissions-control performance. Additionally, a variable cam timing device (e.g., VCT, not shown) may be actuated to adjust the timing of the intake and exhaust valves (not shown) to a timing that provides decreased positive intake to exhaust valve overlap. That is to say, the intake and exhaust valves will be open for a shorter duration and will move away from being simultaneously open for a portion of the intake stroke.

The combustion chambers 231 may be supplied one or more fuels, such as gasoline, alcohol fuel blends, diesel, biodiesel, compressed natural gas, etc., stored in fuel tank 144. Fuel may be supplied to the combustion chambers via direct injection, port injection, throttle valve-body injection, or any combination thereof. Direct injection comprises injecting the fuel directly into the combustion chamber, and port injection delivers the fuel spray into the intake ports where it mixes with the intake air before entering the combustion chamber. The present example may include a plurality of direct fuel injectors 227 and port fuel injectors 228. In the combustion chambers 231, combustion may be initiated via spark ignition and/or compression ignition.

As shown in FIG. 2, exhaust from the one or more exhaust manifold sections is directed to turbine 216 to drive the turbine. When reduced turbine torque is desired, some exhaust may be directed instead through a waste-gate 229, bypassing turbine 216. Waste-gate valve 232 may be actuated open to dump at least some exhaust pressure from upstream of turbine 216 to a location downstream of the turbine via waste-gate 229. By reducing exhaust pressure upstream of turbine 216, turbine speed can be reduced. In one embodiment, waste-gate valve 232 may be vacuum actuated, that is, it may be actuated via an application of vacuum. The combined flow from turbine 216 and waste-gate 229 then flows through one or more emission control devices (not shown in FIG. 2) before all or part of the treated exhaust may be released into the atmosphere via exhaust passage 233. Depending on operating conditions, however, some exhaust may be diverted instead to the intake passage 208 via an EGR passage (not shown) including an EGR cooler and an EGR valve. In one example, EGR may be recirculated to the inlet of compressor 215.

As described above, fuel may be injected to the combustion chambers 231 from fuel stored in fuel tank 144 of the capless refueling system 261. The capless refueling system 261 is coupled to both the Evap system 224 and to the air induction system 211 via passages described below. Furthermore, fuel tank 144 is coupled to each of the capless refueling system 261 and the Evap system 224 as well as a fuel pump system 240.

The fuel pump system 240 may include one or more pumps for pressurizing fuel delivered to the injectors of the engine 210, such as the injector 227 or injector 228 shown. It will be appreciated that fuel system 140 may be a return-less fuel system, a return fuel system, or various other types of fuel system. A fuel level sensor 242 located in fuel tank 144 may provide an indication of the fuel level ("Fuel Level Input") to the controller 12. As depicted, fuel level sensor 242 may comprise a float connected to a variable resistor. Alternatively, other types of fuel level sensors may be used.

Vapors generated in fuel system 140 may be routed to the Evap system 224 via a vapor recovery line 244, before being purged to the intake manifold 217. The vapor recovery line 244 may be coupled to fuel tank 144 via one or more conduits and may include one or more valves for isolating the fuel tank during certain conditions. For example, the vapor recovery line 244 may be coupled to fuel tank 144 via one or more or a combination of conduits 246, 248, and 250. Furthermore, a fuel tank pressure transducer (FTPT) 249 may be coupled to the vapor recovery line 244 to measure a pressure in the vapor recovery line 244.

Further, in some examples, one or more fuel tank vent valves are positioned in conduits 246, 248, and 250, respectively. Among other functions, fuel tank vent valves may allow a fuel vapor canister 278 of the emissions control system to be maintained at a low pressure or vacuum without increasing the fuel evaporation rate from the fuel tank 144 (which would otherwise occur if the fuel tank pressure were lowered). For example, conduit 246 may include a grade vent valve (GVV) 252, conduit 248 may include a fill limit venting valve (FLVV) 254, and conduit 250 may include a grade vent valve (GVV) 256. Further, recovery line 244 may be coupled to a capless unit 258 of the capless refueling system 261. The capless unit 258 is coupled to fuel tank 144 via a fuel filler pipe or neck 260.

The capless unit 258 may be configured to receive a fuel dispensing device, such as the fuel dispensing device 170 of FIG. 1, without demanding removal of a cap. Furthermore, the capless unit 258 enables sealing of fuel system 140 from air external to fuel system 140, e.g., air outside of and surrounding fuel system 140. For example, the capless unit 258 may include two pivotable flaps, e.g., flap valves or flappers, 262 arranged in a receiving port of the capless unit 258, which yield to pressure applied by the fuel dispensing device by pivoting to allow insertion of a nozzle of the fuel dispensing device in the receiving port. The flappers 262 may spring-loaded such that the flappers 262 close and seal the capless unit 258 when the fuel dispensing device is removed.

The capless refueling system 261 includes a pneumatic line 238 which extends between the capless unit 258 and a two-way valve 264. The two-way valve 264 may be included in the recirculation passage 266 (also termed a compressor bypass passage) of the air induction system 211 and may be adjustable between a first position and a second position to vary delivery of compressed and cooled air, e.g., boosted air, to two destinations via two different flow paths. The recirculation passage 266 may route boosted air from a first point downstream of the CAC 207 and upstream of the throttle 212 along the induction passage 205 to a second point downstream of the air box 201 and upstream of compressor 215, where the second point is upstream of the first point. During events where the throttle 212 is released, e.g., an opening of the throttle 212 is decreased, air compressed by compressor 215 (and ebooster 213 when activated) may be no longer demanded by engine combustion. Excess pressure may accumulate downstream of compressor 215 and increase a likelihood of compressor stall if not vented. As such, accumulation of pressure downstream of compressor 215 may be alleviated by drawing the excess boosted air through the recirculation passage 266 via an ejector 268 and returning the boosted air upstream of compressor 215.

The recirculation passage 266 may also include the ejector 268 (also termed an aspirator) located downstream of the two-way valve 264. The ejector 268 may be a passive device providing low cost vacuum generation and may be configured with a constriction to draw flow through a side passage coupled to the ejector 268, as described further below. In other examples, the ejector 268 may an eductor, a jet pump, a venture, or a similar passive device. Flow of boosted air through the recirculation passage 266 causes a low pressure zone to be formed immediately downstream of the constriction of the ejector 268, thereby providing a motive force, e.g., suction, to entrain fuel vapors from the Evap system 224 during a purge event, as described further below. An amount of boosted air diverted through the recirculation passage 266 may not be actively regulated and may depend upon relative pressure within the engine system 110.

When the two-way valve 264 is adjusted to the first position, boosted air may flow from the induction passage 205 through the two-way valve 264, as indicated by arrow 270, and continue flowing through the recirculation passage 266, including the ejector 268, to return to the air induction passage 205, as indicated by arrows 272. In some examples, the first position may be a nominal position of the two-way valve 264. For example, during vehicle operation, the two-way valve may be in the first position and only adjusted to the second position when instructed by the controller 12 under certain conditions, such as conditions suitable for cleaning the capless unit 258.

When the two-way valve 264 is adjusted to the second position, the pneumatic line 238 is fluidically coupled to a portion of the recirculation passage 266 upstream of the two-way valve 264. Boosted air may flow (as indicated by arrow 270) through the portion of the recirculation passage 266 upstream of the two-way valve 264, into the pneumatic line 238, as indicated by arrow 274. For example, when the engine 210 is not operating and a leak is detected at the capless refueling system 261, the controller 12 may command closing of bypass valve 230, adjustment of the two-way valve 264 to the second position, and activation of ebooster 213. Air compressed by ebooster 213 may thereby be delivered to the capless unit 258 of the capless refueling system 261. For example, the pneumatic line 238 may be coupled to a port positioned between the flappers 262 and along a wall of the capless unit 258 and the compressed air may flush an inner volume of the receiving port of the capless unit 258 between the flappers 262, blowing debris trapped therein, as well as between edges of the flappers 262 and inner surfaces of the capless unit 258, away from the flappers 262.

The pneumatic line 238 may also include a fixed orifice 276. The fixed orifice 276 may be configured to reduce a diameter of the pneumatic line 238, therefore creating a constriction that increases a pressure in the pneumatic line 238, upstream of the fixed orifice 276. The increased pressure may increase a velocity of air flow downstream of the fixed orifice 276 which in turn, increases a speed of air flow into the capless unit 258 as well as a force with which the delivered compressed air strikes the flappers 262 and the inner surfaces of the capless unit 258. The capless unit 258 may be cleaned more efficiently as a result. Further details of a cleaning process of the capless unit 258 are provided below, with reference to FIGS. 5 and 6.

The Evap system 224 may include one or more emissions control devices, such as one or more of the fuel vapor canister 278 filled with an appropriate adsorbent, where the canisters are configured to temporarily trap fuel vapors (including vaporized hydrocarbons) during fuel tank refilling operations and "running loss" (that is, fuel vaporized during vehicle operation). In one example, the adsorbent used is activated charcoal, although other types of adsorbents are possible. The Evap system 224 may further include a canister ventilation path or vent line 280 which may route gases out of the canister 278 to the atmosphere when storing, or trapping, fuel vapors from fuel system 140.

The canister 278 may include a buffer 282 (or buffer region). As shown, a volume of the buffer 282 may be smaller than (e.g., a fraction of) a volume of the canister 278. The adsorbent in the buffer 282 may be same as, or different from, the adsorbent in the canister (e.g., both may include charcoal). The buffer 282 may be positioned within the canister 278 such that during canister loading, fuel tank vapors are first adsorbed within the buffer 282, and then when the buffer 282 is saturated, further fuel tank vapors are adsorbed in the canister 278. In comparison, during canister purging, fuel vapors are first desorbed from the canister 278 before being desorbed from the buffer 282. In other words, loading and unloading of the buffer 282 is not linear with the loading and unloading of the canister 278. As such, the effect of the buffer 282 is to dampen any fuel vapor spikes flowing from fuel tank 144 to the canister 278, thereby reducing the possibility of any fuel vapor spikes going to the engine 210. One or more temperature sensors 284 may be coupled to and/or within the canister 278.

The canister 278 may include a canister filter 286 integrated within the canister 278. The canister filter 286 may be disposed near a purge port that couples the canister 278 with a purge line 288. The canister filter 286 may reduce migration of carbon dust (such as, carbon dust resulting from break down of carbon pellets that trap hydrocarbons) from the canister 278 to the purge line 288, and thus reduce clogging of a canister purge valve (CPV) 290 with carbon dust. The CPV 290 may be arranged in the purge line 288 and may control flow of fuel vapors from the canister 278 to the intake manifold 217 and/or the induction passage 205 (e.g., via the recirculation passage 266) during purge events. For example, the CPV 290 may be adjustable between a closed position and an open position where flow from the canister 278 is blocked when the CPV 290 is in the closed position and purging of the canister 278 is enabled when the CPV 290 is in the open position. The CPV 290 may be normally closed but when purging is requested, the CPV 290 may be opened to communicate vacuum from the intake manifold 217 or the recirculation passage 266. Fresh air may be drawn through the vent line 280 and into the canister 278 during purging.

The canister 278 may be fluidically coupled to fuel tank 144 by the vapor recovery line 244 and a conduit 292. The conduit 292 may include a fuel tank isolation valve (FTIV) 294 which may control venting of fuel tank 140 to the canister 278. FTIV 294 may be positioned between fuel tank 144 and the canister 278 within conduit 292, and may be normally in a closed position. When opened, fuel vapors from fuel tank 140 may be vented to canister 278. Fuel vapors may then be vented to atmosphere through the vent line 280, or purged to the intake manifold 217 by opening the CPV 290.

An evaporative leak check module (ELCM) 295 may be coupled to the vent line 280 on an opposite side of the canister 278 from the CPV 290. In other words, the canister 278 is positioned between the CPV 290 and the ELCM 295 along the vent line 280. The ELCM 295 may be used to diagnose leaks in the Evap system 224, particularly when vacuum at the intake manifold 217 is not available or sufficient. For example, the ELCM 295 may include a vacuum pump 296, allowing the ELCM 295 to provide a reference check of pressure in fuel system 140 when the vacuum pump 296 is activated to draw pressure on a reference orifice of the ELCM 295. A resulting pressure measured by an ELCM pressure sensor 297 at the reference orifice may be used as a reference for detecting leaks. A hydrocarbon sensor 298 may be coupled at or near the ELCM 295 within the vent line 280.

The purge line 288 may be branched downstream of the CPV 290. For example, as shown in FIG. 2, the purge line 288 may be split between a first purge conduit 287 fluidically coupling the purge line 288 to the intake manifold 217 and a second purge conduit 289 fluidically coupling the purge line 288 to the recirculation passage 266 at the ejector 268. The first purge conduit 287 may include a first check valve 291 that constrains flow within the first purge conduit 287 to a direction indicated by arrow 293 during purge events. Similarly, the second purge conduit 289 may include a second check valve 299 that constrains flow within the second purge conduit 289 to a direction indicated by arrow 285 during purge events.

When the CPV 290 is opened during purge events, fuel vapors desorbed from the canister 278 may be routed to the intake manifold 217 via the first purge conduit 287 and/or the second purge conduit 289 depending on a first pressure differential between the canister 278 and the intake manifold 217 and/or a second pressure differential between the canister 278 and the ejector 268. For example, as boosted air flows through the recirculation passage 266, the low pressure region immediately downstream of the constriction of the ejector 268 may draw fuel vapors from the purge line 288 into the recirculation passage 266 at the ejector 268. As such, fuel vapors may be delivered to the engine 210 via the first purge conduit 287 directly to the intake manifold 217 and/or via the second purge conduit 289, the ejector 268, and the recirculation passage 266 to the air induction system 211, downstream of the air box 201 and upstream of compressor 215. In some instances, fuel vapors may be delivered to both destinations concurrently. Furthermore, relative amounts of fuel vapors delivered to each of the destinations may be proportional to differences relative magnitudes of the first and second pressure differentials. For example, if the first pressure differential is greater than the second pressure differential, more fuel vapor may be directed to the intake manifold 217 than to the air induction system 211 upstream of compressor 215.

Fuel system 140 may be operated by the controller 12 in a plurality of modes by selective adjustment of various valves and solenoids. For example, fuel system 140 may be operated in a fuel vapor storage mode (e.g., during a fuel tank refueling operation and with the engine not running), where the controller 12 may command opening of the FTIV 294 while closing the CPV 290 to direct refueling vapors into the canister 278 while blocking flow of fuel vapors to the intake manifold 217.

As another example, fuel system 140 may be operated in a refueling mode (e.g., when fuel tank refueling is requested by a vehicle operator), where the controller 12 may command opening of the FTIV 294 while maintaining the CPV 290 closed, to depressurize fuel tank 144 before allowing fuel to be added therein. As such, the FTIV 294 may be kept open during the refueling operation to allow refueling vapors to be stored in the canister 278. After refueling is completed, the FTIV 294 may be closed.

As yet another example, the fuel system may be operated in a canister purging mode during engine operation, where the controller 12 may open CPV 290 while closing FTIV 294. Herein, the vacuum generated by the intake manifold 217 of the operating engine 210 may be used to draw fresh air through the vent 280 and through the canister 278 to purge the stored fuel vapors into the intake manifold 217. In this mode, the purged fuel vapors from the canister 278 are combusted in the engine 210. The purging may be continued until the stored fuel vapor amount in the canister is below a threshold.

Leak detection routines may be intermittently performed by the controller 12 on fuel system 140 to confirm that fuel system 140 is not degraded. As such, leak detection routines may be performed by the ELCM 295, as instructed by the controller 12, while the engine 210 is off (engine-off leak test) using engine-off natural vacuum (EONV) generated due to a change in temperature and pressure at fuel tank 144 following engine shutdown and/or with vacuum supplemented from the ELCM vacuum pump 296. Alternatively, leak detection routines may be performed while the engine 210 is running by operating the ELCM vacuum pump 296 and/or using engine intake manifold vacuum. Following the application of vacuum to fuel system 140, a change in pressure at the reference orifice (e.g., an absolute change or a rate of change) of the ELCM 295 may be monitored and compared to a threshold. Based on the comparison, a fuel system leak may be diagnosed.

Engine system 110 may be communicatively coupled to control system 190. Control system 190 is shown receiving information from a plurality of sensors 16 (various examples of which are described herein) and sending control signals to a plurality of actuators 81 (various examples of which are described herein). As one example, sensors 16 may include the manifold absolute pressure (MAP) sensor 234, an exhaust oxygen sensor 235 arranged in the exhaust manifold 226, an exhaust temperature sensor 236, an exhaust pressure sensor 237, the compressor inlet temperature sensor 221, the compressor inlet pressure sensor 222, the manifold air flow sensor 223, the canister temperature sensor 284, the ELCM pressure sensor 297, the FTPT 249, and the HC sensor 298. Other sensors such as additional pressure, temperature, air/fuel ratio, and composition sensors may be coupled to various locations in engine system 110 and fuel system 140. The actuators 81 may include, for example, throttle 212, bypass valve 230, waste-gate valve 232, direct fuel injector 227, port fuel injector 228, the CPV 290, the FTIV 294, the two-way valve 264, the ELCM vacuum pump 296, ebooster 213, fuel pump system 240, amongst others.

The control system 190 includes the controller 12 which may receive input data from the various sensors, process the input data, and employ the various actuators based on the received signals and instructions stored on a memory of the controller 12. The controller 12 may employ the actuators 81 in response to the processed input data based on instruction or code programmed therein corresponding to one or more routines, such as example control routines described herein with regard to FIG. 5. As one example, the controller may send a signal to adjust the two-way valve 264 to the second position and a signal to a motor of ebooster 213 to energize the ebooster, when the engine is not operating, in response to detection of a leak in fuel system 140. Ebooster 213 may deliver compressed air to the capless unit 258 to free the capless unit 258 of debris inhibiting sealing at the flappers 262 of the capless unit 258.

The capless unit 258 of FIG. 2 is shown in greater detail in FIG. 3. Therein, the capless unit 258 has a generally cylindrical geometry with a central axis 301. The capless unit 258 has a cover 300 surrounding an inner volume of the capless unit 258 that forms a receiving port or receptacle 303 of the capless unit 258. As described above, the receiving receptacle 303 is configured to receive a nozzle of fuel dispensing device, such as the fuel dispensing device 170 of FIG. 1. The cover 300 is configured to enclose components in the assembly. The capless unit 258 further includes an external housing 302 configured to at least partially enclose various internal components of the capless unit 258.

The capless unit 258 further includes a first, upstream flapper 262a of the flappers 262 of FIG. 2, the upstream flapper 262a having a hinge 306. The upstream flapper 262a is inset from the cover 300. A preloaded upstream spring 308 may be coupled to the upstream flapper 262a and the external housing 302. The preloaded upstream spring 308 coupled to the upstream flapper 262a may provide a return force to the door when opened. The upstream spring 308 is configured to provide a return force when the upstream flapper 262a is depressed via the nozzle of the fuel dispensing device. In this way, the upstream flapper 262a may close after the nozzle is removed during a refueling event. Thus, the upstream flapper 262a automatically closes without assistance from a refueling operator. As a result, the refueling process is simplified.

A seal 310 may be attached to the upstream flapper 262a. Specifically, the seal 310 may extend around the periphery of the upstream flapper 262a, in some examples. When the upstream flapper 262a is in a closed position the seal 310 may be in face-sharing contact with the cover 300. In this way, the evaporative emissions from the capless unit 258 are reduced.

The capless unit 258 further includes a locking lip 312. The locking lip 312 may be configured to receive a portion of the nozzle. In some examples, the locking lip 312 may be provided around at least 100° of an inner circumference of the capless unit 258. The locking lip 312 may influence a positioning and angle of the nozzle axis spout during refueling and therefore may affect filling performance.

The capless unit 258 also includes an internal housing 314. Walls of the internal housing 314 may define a nozzle enclosure configured to receive the nozzle. The internal housing 314 may include a nozzle stop actuator 316 configured to actuate a portion of the nozzle that initiates fuel flow from the nozzle.

An upstream body seal 318 and a downstream body seal 320 may be provided in the capless unit 258 to seal the external housing 302 and various internal components in the capless unit 258. Specifically, the upstream and downstream body seals (318 and 320) are configured to extend between the external housing 302 and the internal housing 314. The upstream body seal 318 and/or downstream body seal 320 may be an O-ring, in some examples.

The capless unit 258 further includes a second, downstream flapper 262b of the flappers 262 of FIG. 2, the downstream flapper 262b positioned downstream of the upstream flapper 262a and the nozzle stop actuator 316. The downstream flapper 262b includes a hinge 323 and has a preloaded downstream spring 324 coupled thereto. The preloaded downstream spring 324 is coupled to the downstream flapper 262b providing a return force to the downstream flapper 262b when opened. The downstream spring 324 is also coupled to the external housing 302. The downstream spring 324 is configured to provide a return force to the downstream flapper 262b when the downstream flapper 262b is in an open position. The downstream flapper 262b may also include a seal 326 (e.g., flap seal). The seal 326 may be positioned around a periphery of the downstream flapper 262b, in some examples. The downstream flapper 262b enables the evaporative emissions during the refueling process to be reduced by sealing the Evap system (e.g., the Evap system 224 of FIG. 2, from surrounding atmosphere. The upstream flapper 262a therefore reinforces sealing of the Evap system and may be configured as a backup to the downstream flapper 262b. The downstream flapper 262b is arranged perpendicular to the fuel flow when closed, in the depicted example. However, other orientations of the downstream flapper 262b are possible.

The capless unit 258 may be positioned in a number of configurations in the vehicle system 100, shown in FIG. 1. In one example, the capless unit 258 has a downward gradient. In other words, the upstream flapper 262a is positioned vertically above flow guide 350 with regard to gravitational axis 352. In this way, fuel flow is assisted via gravity during refueling operation.

The capless unit 258 includes flow guide 350 which is arranged downstream of downstream flapper 262b. The capless unit 258 further includes the filler pipe 260 of FIG. 2. Flow guide 350 may be at least partially enclosed by the filler pipe 260 which is in fluidic communication with the fuel tank, e.g., fuel tank 144 as shown in FIG. 2.

The capless unit 258 may further include a vacuum relief mechanism (not shown). The vacuum relief mechanism may allow a passage in the capless unit 258 to open under a threshold vacuum, allowing for the venting of the fuel tank to atmosphere. In this way, an excess of fuel tank vacuum will cause the vacuum relief mechanism to vent to atmosphere, circumventing collapsing of the fuel tank. The vacuum threshold for activating the vacuum relief mechanism may be set at −18 in $H_2O$, for example, or at a suitable threshold depending on the fuel tank design and configuration. The vacuum threshold may also be set at a level greater (e.g., a stronger vacuum) than vacuum conditions used for fuel tank leak testing using the ELCM, e.g., the ELCM 295 of FIG. 2. In this way, an ELCM testing cycle may not trigger the vacuum relief mechanism (which may cause a false fail result), but such that naturally occurring tank vacuum above a threshold may be relieved.

In some embodiments, the vacuum relief mechanism may not be an additional hardware component within the capless unit 258. Rather, preloaded upstream spring 308 and preloaded downstream spring 324 may be set with a tension such that fuel tank vacuum above a threshold (e.g. −18 in $H_2O$) will cause upstream flapper 262a and downstream flapper 262b to open, venting the fuel tank to atmosphere. In some embodiments, preloaded upstream spring 308 and preloaded downstream spring 324 may be solenoid activated springs under control of the controller, e.g., the controller 12 of FIG. 2. When fuel tank vacuum increases above the threshold vacuum (as determined by FTPT 249 of FIG. 2, for example) the controller may deactivate the solenoids, allowing for upstream flapper 262a and downstream flapper 262b to open, venting the fuel tank to atmosphere. Upon fuel tank vacuum reaching a threshold level, the solenoids may be re-activated.

As described above, with reference to FIG. 2, the capless unit 258 may have a port 330 at which the pneumatic line 238 may couple to the capless unit 258. The pneumatic line 238 may be fluidically coupled to the receiving receptacle 303 of the capless unit 258 by the port 330. As shown in FIG. 2, the pneumatic line 238 may extend between the capless unit 258 and the two-way valve (e.g., the two-way valve 264 of FIG. 2), where the two-way valve is configured to control delivery of compressed air from the ebooster (e.g., ebooster 213 of FIG. 2) to the capless unit 258. The port 330 may include a port flap 332 that covers an opening in the wall of the capless unit 258 that forms the port 330. The port flap 332 may be maintained in place and aligned parallel with the wall of the capless unit 258 by a spring hinge 334. A spring force of the spring hinge 334 may be overcome by incoming compressed air, as delivered from the ebooster through the pneumatic line 238, allowing the port flap 332 to swing inwards, as indicated by arrow 336, to allow an inflow of compressed air.

As shown in FIGS. 2 and 3, the pneumatic line 238 is coupled to the capless unit 258 at a point along the central axis 301 that is between the upstream flapper 262a and the downstream flapper 262b. Cleaning of the capless unit 258 may be requested when a leak is detected in the Evap system. A cleaning process may be initiated by using the ELCM to draw the pressure in the Evap system to at least the vacuum threshold, as described above. At the vacuum threshold, the flappers, e.g., the upstream flapper 262a and the downstream flapper 262b, may alternate between swinging open and closed, e.g., flapping, due to the vacuum in the Evap system overcoming the stiffness and resistance of each of the upstream spring 308 and the downstream spring 324.

Upon the pressure reaching the vacuum threshold, the two-way valve may be adjusted to the second position to fluidically couple the capless unit 258 to the ebooster. The ebooster may be activated to direct compressed air to the capless unit. The compressed air may strike the flappers and remove debris trapped between the flappers and their respective seals, e.g., the seals 310 and 326. The cleaning process may be repeated, e.g., vacuum generation in the Evap system followed by blasting with compressed air, until the leak is no longer detected by the ELCM.

In another embodiment, a capless unit of a capless refueling system may be coupled to a pneumatic manifold arranged between the capless unit and an end of a pneumatic line. For example, as shown in FIG. 4, a capless unit 400 may include an upstream flapper 402 and a downstream flapper 404, similarly configured as the flappers 262 of the capless unit 258 of FIGS. 2 and 3. The capless unit 400 may have more than one port for delivery of compressed air to an inner volume of the capless unit 400, however. For example, the capless unit 400 may have a first port 406 with a first port flap 408 and a second port 410 with a second port flap 412. Each of the ports and corresponding port flaps may be similar to the port 330 and port flap 332 of FIG. 3, as described above.

The first port 406 and the first port flap 408 may be positioned along a central axis 401 of the capless unit 400 such that the first port 406 and the first port flap 408 are vertically above the upstream flapper 402. The second port 410 and the second port flap 412 may be similarly positioned vertically above the downstream flapper 404, relative to the central axis 401. Each of the first port 406 and the second port 410 may be coupled to one of two branches of a pneumatic manifold 414.

The pneumatic manifold 414 may extend between the ports of the capless unit 400 and an end of the pneumatic line 238. In this way, when compressed air is delivered to the capless unit 400, the compressed air is split between the branches of the pneumatic manifold 414 to divert a first portion of the compressed air to the first port 406 and a second portion of the compressed air to the second port 410. The first and second portions of the compressed air may be equal or may be different, depending on inner volumes of the branches of the pneumatic manifold 414. For example, the branch of the pneumatic manifold 414 coupled to the second port 410 may be narrower than the branch coupled to the first port 406, thereby delivering a smaller volume of air at a higher pressure through the second port 410. As another, one or both branches may include a fixed orifice, such as the fixed orifice 276 of FIG. 2 to adjust a pressure in the respective branch of the pneumatic manifold 414.

The positioning of the first and second ports 406, 410 allows compressed air to be delivered to a region above, with respect to the central axis 401, each of the upstream and downstream flappers 402, 404. For example, compressed air may enter the capless unit 400 through the first port 406 and contact an upper surface of the upstream flapper 402 and through the second port 410 and contact an upper surface of the downstream flapper 404 as well as a bottom surface of the upstream flapper 404. As a result, greater turbulence may be generated upon compressed air delivery into the capless unit 400, which may displace and remove debris more effectively than the configuration of the capless unit shown in FIG. 3 which may be desirable for vehicles used for frequent off road driving, for example.

Figure 5:
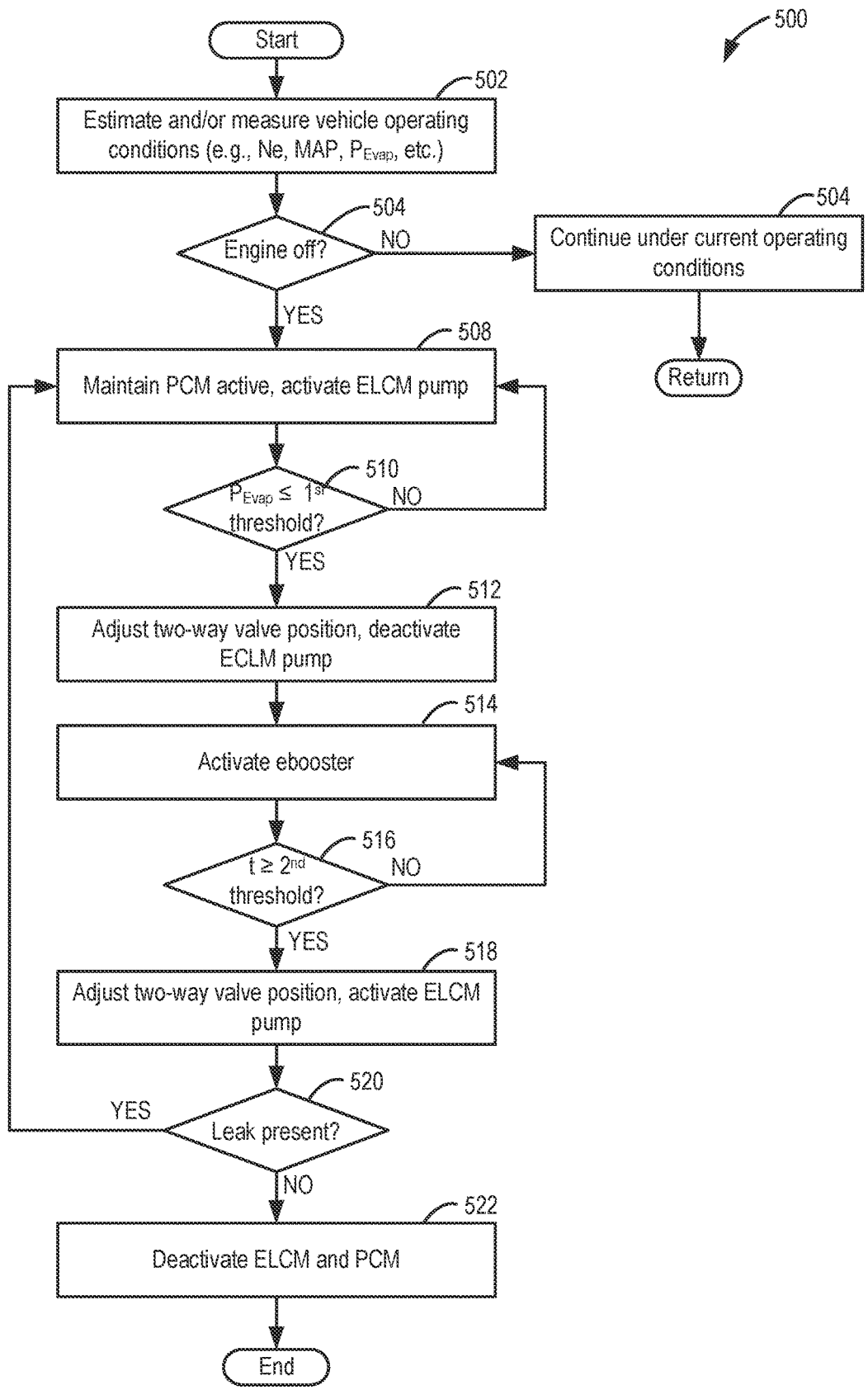
FIG. 5 shows an example of a method for cleaning the capless refueling system using the ebooster.

A method 500 for cleaning a capless unit of capless refueling system is depicted in FIG. 5. The capless unit may be the capless unit 258 of FIGS. 2 and 3 or the capless unit 400 of FIG. 4, included in a capless refueling system of a vehicle, such as the vehicle system 100 of FIG. 1. The capless refueling system may be coupled to an Evap system and an air induction system of an engine system, such as the Evap system 224 and the engine system 110 of FIG. 2. A pneumatic line may fluidically couple the capless unit to the air induction system via a two-way valve, such as the two-way valve 264 of FIG. 2. During engine operation, the two-way valve may be in a first position, fluidically coupling a region of the air induction system downstream of a compressor and an ebooster to a region upstream of both the compressor and the ebooster via a recirculation passage (e.g., the recirculation passage 266 of FIG. 2). The two-way valve may be selectively adjusted to a second position to fluidically couple the region of the air induction system downstream of the compressor and the ebooster to the capless unit. Instructions for carrying out method 500 may be executed by a controller (e.g., a PCM), such as the controller 12 of FIG. 2, based on instructions stored on a memory of the controller and in conjunction with signals received from sensors of the engine system, such as the sensors described above with reference to FIG. 2. The controller may employ engine actuators of the engine system to adjust engine operation, according to the method described below.

In one example, method 500 may be executed upon detection of a leak in the Evap system by an ELCM, e.g., the ELCM 295 of FIG. 2. For example, the ELCM may conduct a leak test when conditions are suitable, as described above with reference to FIG. 2, and results of the leak test may be stored in the controller's memory. Detection of a leak may cause a diagnostic trouble code (DTC) to be set. If a leak is confirmed based on the leak test, the leak may be due to debris trapped in the capless unit which may degrade an ability of the capless unit's flappers to seal against inner surfaces of the capless unit. As such, the method may be conducted opportunistically, e.g., as soon as possible after confirming the presence of the Evap system leak, when conditions are suitable.

As another example, method 500 may be automatically executed based on a pre-set frequency or a duty cycle of the capless unit, such as every three days, every week, etc. Furthermore, the pre-set frequency may change depending on how often the vehicle is driven and driving conditions the vehicle is subjected to. For example, if the vehicle is driven off-road (e.g., as determined based on a GPS, route history data, etc.) for more than 50% of its driving cycles, the pre-set frequency may be increased relative to driving cycles primarily constrained to paved roads. Additionally, the pre-set frequency may be increased during seasonal changes, such as transitions from winter to spring or during periods of turbulent weather patterns.

In yet another example, method 500 may be conducted after a vehicle configured with the capless refueling system is assembled, e.g., at an assembly plant, and transported to a new location. Upon arrival at the new location, cleaning of the capless unit may be desirable to mitigate a presence of debris in the capless unit resulting from shipping of vehicle parts, handling of components during assembly, transportation of the assembled vehicle via, trains/trucks, etc. Similarly, cleaning of the capless unit may be desirable after maintenance on the Evap system or fuel system of the vehicle has been performed. For example, servicing of the vehicle fuel tank may result in accumulation of debris at the capless unit and execution of method 500 prior to vehicle operation may circumvent evaporative emissions leaks.

At 502, the method includes estimating and/or measuring current vehicle operating conditions. For example, an engine speed may be monitored to determine a status of the engine, a pressure at an intake manifold of the engine system, a pressure in the Evap system, such as a pressure monitored by a FTPT, etc. The method proceeds to 504 to determine if the engine is off, e.g., not combusting air/fuel. If the engine is not off, e.g., the engine is operating, the method proceeds to 506 to continue engine operation under the current vehicle operating conditions. The method returns to the start.

If the engine is off, the method continues to 508 to maintain the controller active and to actuate the ELCM vacuum pump. By actuating the ELCM vacuum pump, the ELCM vacuum pump is energized to draw down a pressure in the Evap system. For example, the CPV 290 of FIG. 2 may be closed and the FTIV 294 opened while the ELCM vacuum pump is actively generating vacuum in the Evap system.

At 510, the method includes confirming if the pressure in the Evap system is at or below a threshold pressure. The threshold pressure may be a pressure sufficiently low to overcome a stiffness of spring-based hinges of the capless unit flappers. For example, the threshold pressure may be $-18$ in $H_2O$. Upon overcoming the stiffness of the springs of the flappers, the low pressure in the Evap system causes the flappers to intermittently pivot and open, allowing air external to the Evap system to enter the capless pressure and raise the pressure in the Evap system. The raise in pressure allows the flappers to close which, in turn allows the ELCM to draw down the pressure again to the threshold pressure. The flappers may open and close repeatedly according to fluctuations in the Evap system pressure, e.g., flap. By compelling the flappers to flap, debris trapped in the capless unit, such as debris accumulated around peripheries of the flappers, as well as surfaces of the flappers, may be loosened and/or displaced.

If the Evap system pressure is above the threshold pressure, the method returns to 508 to continue maintain the controller and the ELCM vacuum pump active. If the Evap system pressure is at or lower than the threshold pressure, the method continues to 512 to adjust the position of the two-way valve to the second position to fluidically couple the ebooster to the capless unit. Additionally, the ELCM vacuum pump is deactivated.

At 514, the method includes activating the ebooster. For example, a motor controlling operation of the ebooster may be energized, drawing energy from an energy storage device such as a battery. By activating the ebooster, the capless unit may receive a blast of compressed air which may further displace and remove debris from the peripheries and surfaces of the flappers. The ebooster may be activated continuously for a target period of time or may be pulsed over the target period of time.

At 516, the method includes determining if an elapsed period of time of since initially activating the ebooster reaches a second threshold. The second threshold may be the target period of time described above which may be, for example, a period of 5 seconds or between 3-10 seconds. Alternatively or additionally, the second threshold may be a period of time for the Evap system to return to atmospheric pressure due to inflow of compressed air. If the elapsed time does not reach the second threshold, the method returns to 514 to continue operating the ebooster to deliver compressed air to the capless unit.

If the elapsed time reaches the second threshold, the method proceeds to 518 to adjust the position of the two-way valve to the first position to fluidically decouple the ebooster from the capless unit. The ELCM vacuum pump is activated to perform a leak test. For example, with the CPV maintained closed and the FTIV maintained open, the ELCM vacuum pump may draw the Evap system pressure down to a target pressure for the leak test. The target pressure may be a pressure higher than the threshold pressure of 510 such that the target pressure does not cause the flappers of the capless unit to flap.

At 520, the method includes confirming if a leak is present in the Evap system. If a leak is detected, the method returns to 508 to maintain the controller active and actuate the ELCM vacuum pump (if the ELCM vacuum pump was deactivated upon completion of the leak test) or maintain the ELCM vacuum pump on. It will be appreciated that, in some examples, 508-520 of method 500 may be repeated up to a maximum number of repetitions. For example, the maximum number of repetitions may be three times and if, by the third repetition, the leak is still detected, a DTC may be set to indicate the presence of the leak. In some examples, if the leak is not resolved after executing the maximum number of cleaning cycles of the capless unit, it may be determined that additional maintenance of the capless refueling system is demanded or that the leak is due to a different component in the capless refueling system of the Evap system. As such, other diagnostic procedures may be performed.

If, at 520, no leak is detected, the method proceeds to 522 to deactivate the ELCM (if not already deactivated subsequent to completion of the leak test) as well as the controller. The method ends.

Figure 6:
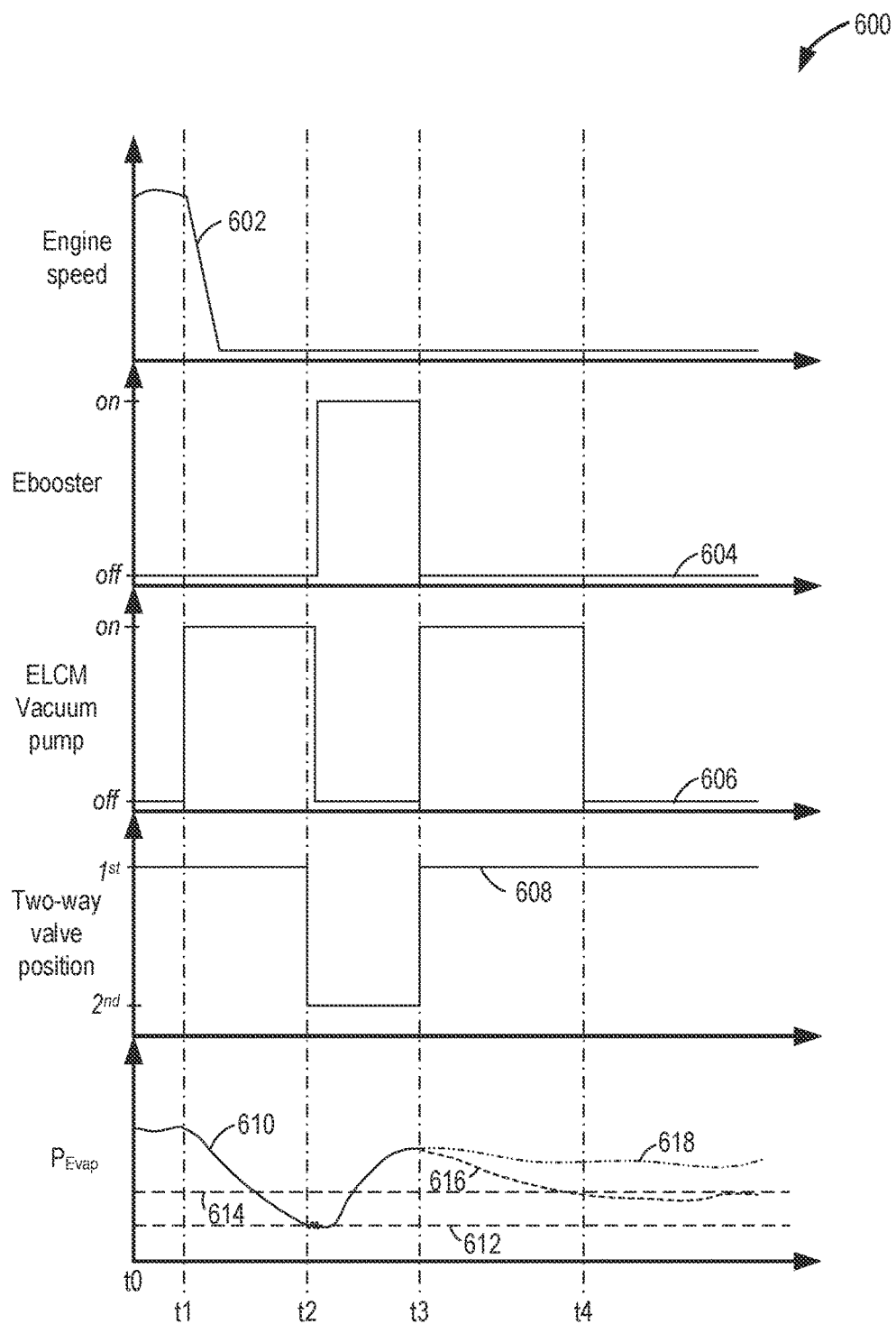
FIG. 6 shows a graph depicting exemplary adjustments to vehicle parameters during cleaning of the capless refueling system.

Adjustments to vehicle parameters to conduct a cleaning process, such as method 500 of FIG. 5, for a capless refueling system are depicted in graph 600 in FIG. 6. As described above, the cleaning process may be conducted based on a setting of a DTC code to indicate a leak at an Evap system of the vehicle or based on a pre-set frequency for cleaning the capless refueling system. The capless refueling system may be coupled to the Evap system and an engine system as illustrated in FIG. 2 and may include a capless unit such as the capless unit of FIGS. 2 and 3 or FIG. 4. Time is plotted along the abscissa of graph 600, increasing to the right. Graph 600 includes a first plot 602 representing engine speed, a second plot 604 representing a status of an ebooster, a third plot 606 representing a status of an ELCM vacuum pump, a fourth plot 608 representing a position of a two-way valve, and a fifth plot 610 representing a pressure of the Evap system. The engine speed (e.g., the first plot 602) and the Evap system pressure (e.g., the fifth plot 610) increase upwards along the ordinate. The Evap system pressure includes a first threshold 612 and a second threshold 614. The first threshold 612 may be a pressure sufficiently low to cause the capless unit flappers to flap, as described above with reference to FIG. 5. The second threshold 614 may be a reference pressure for determining a presence of a leak in the Evap system and may be set at a higher pressure (e.g., lower vacuum) than the first threshold 612. The statuses of the ebooster (e.g., the second plot 604) and the status of the ELCM vacuum pump (e.g., the third plot 606) alternate between on and off. The position of the two-way valve is adjusted between a first position that fluidically decouples the ebooster from the capless unit and a second position that fluidically couples the ebooster to the capless unit.

At t0, the engine is operating and the ebooster is deactivated. The ELCM vacuum pump is off and the two-way valve is in the first position. A pressure in the Evap system may be at or near atmospheric pressure. The engine is turned off at t1. For example, the engine is keyed off, a button requesting engine operation termination may be depressed, a button on a key fob may be pressed, etc. The ebooster remains deactivated at t1 and the ELCM vacuum pump is actuated to decrease the Evap system pressure. The two-way valve is maintained in the first position.

The Evap system pressure is drawn down by the ELCM vacuum pump until the pressure reaches the first threshold 612 at t2. In response, the two-way valve is adjusted to the second position. Flapping of the flappers causes the pressure in the Evap system to oscillate until the ELCM vacuum pump is turned off and the ebooster is activated. Compressed air is delivered to the capless unit between t2 and t3, increasing the Evap system pressure.

At t3, an elapsed time since initially delivering the compressed air to the capless unit from the ebooster reaches a threshold period of time, such as the second threshold described at 516 of FIG. 5. Upon reached the threshold period of time, the ebooster is deactivated and the two-way valve is adjusted to the first position. The ELCM vacuum pump is activated to perform a leak test. Performing the leak test includes drawing the Evap system pressure down for a target period of time. For example, in a first scenario indicated by dashed line 616, the Evap system is sealed from the surrounding atmosphere. The leak test is conducted over a target period of time, e.g., over a duration of time between t3 and t4. The ELCM pump is able to decrease the pressure in the Evap system to the second threshold 614 with the target period of time, confirming an integrity of the Evap system, e.g., no leak is present. The ELCM pump is deactivated at t4.

Alternatively, in a second scenario indicated by dashed line 618, the Evap system pressure does not reach the second threshold 614 within the target period of time. The ELCM pump is deactivated at t4 and a DTC indicating a presence of a leak may be set. In some examples, the cleaning process may be repeated up to a predetermined number of repetitions, such as 3 times, before the DTC is set if the Evap system pressure does not reach the second threshold 614 during any of the repetitions.

In this way, a capless unit of a capless refueling system may be efficiently cleaned onboard using a device that is activated intermittently during engine operation. As such, the device, e.g., an ebooster, is readily available during engine off conditions. The capless refueling system also includes a pneumatic line extending between a two-way valve and the capless unit. The two-way valve may be arranged in a recirculation passage of an air induction system and may be adjustable between a first position that blocks flow of compressed air between the air induction system and the capless unit and a second position that allows compressed air to be delivered to the capless unit via the pneumatic line. The cleaning of the capless unit further relies on generation of vacuum within an Evap system coupled to the capless refueling system by activation of a vacuum-generating device, such as an ELCM vacuum pump. As a result, the capless unit is freed of debris that may otherwise cause leaks and lead to escape of evaporative emissions without demanding time-consuming and costly maintenance operations. Furthermore, a cleaning frequency of the capless unit may be modified according to driving and weather conditions, thereby further suppressing release of evaporative emissions.

The technical effect of using compressed air delivered by the ebooster to clean the capless unit during engine off conditions is that the controller is able to command cleaning of the capless unit in response to detection of a leak in the Evap system without interfering with engine performance.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The disclosure also provides support for a method comprising: cleaning a capless unit of a capless refueling system by generating vacuum in the capless refueling system and delivering compressed air to the capless unit from an electrical booster of an engine. In a first example of the method, generating the vacuum in the capless refueling system includes activating a vacuum pump of an evaporative leak check module (ELCM) while the engine is not operating. In a second example of the method, optionally including the first example, delivering the compressed air to the capless unit includes adjusting a two-way valve arranged in a path of air flow between the electrical booster and the capless unit to a first position and wherein the first position of the two-way valve is configured to fluidically couple the electrical booster to the capless unit. In a third example of the method, optionally including one or both of the first and second examples, delivering the compressed air to the capless unit further includes flowing the compressed air through a pneumatic line extending between the two-way valve and the capless unit. In a fourth example of the method, optionally including one or more or each of the first through third examples, generating the vacuum in the capless refueling system includes drawing a pressure down in the capless refueling system to induce intermittent opening of pivotable flaps in the capless unit. In a fifth example of the method, optionally including one or more or each of the first through fourth examples, delivering the compressed air to the capless unit includes flowing the compressed air to the capless unit after the pressure in the capless refueling system is sufficiently low to induce the intermittent opening of the pivotable flaps. In a sixth example of the method, optionally including one or more or each of the first through fifth examples, the method further comprises: performing a leak test after cleaning of the capless unit is complete and repeating the cleaning when a presence of a leak is indicated.

The disclosure also provides support for a capless refueling system for a vehicle, comprising: a capless unit having a set of pivotable flaps and configured to receive a nozzle of a fuel dispensing device, and an electrical booster used to deliver compressed air to the capless unit to clean the capless unit, the electrical booster fluidically coupled to the capless unit by a two-way valve and a pneumatic line extending between the two-way valve and the capless unit. In a first example of the system, the pneumatic line is coupled to the capless unit at a port of the capless unit, the port positioned between a first pivotable flap and a second pivotable flap of the set of pivotable flaps along a central axis of the capless unit. In a second example of the system, optionally including the first example, the pneumatic line is coupled to a manifold extending between an end of the pneumatic line and ports of the capless unit and wherein the ports are positioned above each flap of the set of pivotable flaps along a central axis of the capless unit. In a third example of the system, optionally including one or both of the first and second examples, the two-way valve is arranged in a recirculation passage of an air induction system, the recirculation passage fluidically coupling a first region in the air induction system downstream of a compressor and the electrical booster to a second region in the air induction system upstream of the compressor and the electrical booster and wherein the two-way valve is a junction where the pneumatic line intersects with the recirculation passage. In a fourth example of the system, optionally including one or more or each of the first through third examples, the two-way valve is adjustable between a first position, the first position fluidically coupling the first region of the air induction system to the second region of the air induction system, and a second position, the second position fluidically coupling the first region of the air induction system to the capless unit. In a fifth example of the system, optionally including one or more or each of the first through fourth examples, the two-way valve is maintained in the first position during operation of an engine of the vehicle and adjusted to the second position when the engine is not operating and a request for cleaning the capless unit is received and wherein the two-way valve is returned to the first position after the capless unit is cleaned. In a sixth example of the system, optionally including one or more or each of the first through fifth examples, the capless refueling system is fluidically coupled to an evaporative emissions control (Evap) system of the vehicle via a fuel tank isolation valve (FTIV) and wherein the Evap system of the vehicle includes an evaporative leak check module (ELCM) with a vacuum pump. In a seventh example of the system, optionally including one or more or each of the first through sixth examples, the vacuum pump of the ELCM is used to reduce a pressure in the capless refueling system when an engine of the vehicle is not operating and the FTIV is adjusted to an open position prior to delivering the compressed air to the capless unit from the electrical booster.

The disclosure also provides support for a method for cleaning a capless refueling system of a vehicle, comprising: responsive to a request for cleaning of a capless unit of the capless refueling system, generating vacuum in the capless refueling system during an engine-off condition, adjusting a two-way valve to a first position to fluidically couple an electrical booster to the capless unit and activating the electrical booster, delivering air compressed by the electrical booster to the capless unit via a pneumatic line extending between the capless unit and the two-way valve, and responsive to confirmation of no leaks in the capless refueling system, deactivating the electrical booster and adjusting the two-way valve to a second position to fluidically decouple the electrical booster from the capless unit. In a first example of the method, generating the vacuum responsive to the request for cleaning of the capless unit includes generating the vacuum in response to one or more of receiving confirmation of a leak detected in the capless refueling system and reaching a pre-determined duty cycle of the capless unit. In a second example of the method, optionally including the first example, generating the vacuum in response to reaching the pre-determined duty cycle of the capless unit includes cleaning the capless unit based on a frequency corresponding to one or more of driving conditions, driving frequency, weather, and seasonal transitions. In a third example of the method, optionally including one or both of the first and second examples, the method further comprises: responsive to detection of a leak after cleaning of the capless unit is complete, setting a diagnostic trouble code indicating the leak. In a fourth example of the method, optionally including one or more or each of the first through third examples, the method further comprises: maintaining a controller of the vehicle active during the engine-off condition.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A capless refueling system for a vehicle, comprising:
    a capless unit having a set of pivotable flaps and configured to receive a nozzle of a fuel dispensing device; and
    an electrical booster used to deliver compressed air to the capless unit to clean the capless unit, the electrical booster fluidically coupled to the capless unit by a two-way valve, and a pneumatic line extending between the two-way valve and the capless unit.

2. The capless refueling system of claim 1, wherein the pneumatic line is coupled to the capless unit at a port of the capless unit, the port positioned between a first pivotable flap and a second pivotable flap of the set of pivotable flaps along a central axis of the capless unit.

3. The capless refueling system of claim 1, wherein the pneumatic line is coupled to a manifold extending between an end of the pneumatic line and ports of the capless unit, and wherein the ports are positioned above each flap of the set of pivotable flaps along a central axis of the capless unit.

4. The capless refueling system of claim 1, wherein the two-way valve is arranged in a recirculation passage of an air induction system, the recirculation passage fluidically coupling a first region in the air induction system downstream of a compressor and the electrical booster to a second region in the air induction system upstream of the compressor and the electrical booster and wherein the two-way valve is a junction where the pneumatic line intersects with the recirculation passage.

5. The capless refueling system of claim 4, wherein the two-way valve is adjustable between a first position, the first position fluidically coupling the first region of the air induction system to the second region of the air induction system, and a second position, the second position fluidically coupling the first region of the air induction system to the capless unit.

6. The capless refueling system of claim 5, wherein the two-way valve is maintained in the first position during operation of an engine of the vehicle and adjusted to the second position when the engine is not operating and a request for cleaning the capless unit is received and wherein the two-way valve is returned to the first position after the capless unit is cleaned.

7. The capless refueling system of claim 1, wherein the capless refueling system is fluidically coupled to an evaporative emissions control (Evap) system of the vehicle via a fuel tank isolation valve (FTIV), and wherein the Evap system of the vehicle includes an evaporative leak check module (ELCM) with a vacuum pump.

8. The capless refueling system of claim 7, wherein the vacuum pump of the ELCM is used to reduce a pressure in the capless refueling system when an engine of the vehicle is not operating and the FTIV is adjusted to an open position prior to delivering the compressed air to the capless unit from the electrical booster.

* * * * *